United States Patent [19]

Anger et al.

[11] Patent Number: 5,801,461
[45] Date of Patent: Sep. 1, 1998

[54] DEVICE FOR MONITORING THE OPERATION SAFETY OF POWER SWITCHES

[75] Inventors: Nils Anger; Werner Reinert, both of Berlin; Johannes Hilpert, Strullendorf, all of Germany

[73] Assignee: Siemens Aktiengesellschaft, Munich, Germany

[21] Appl. No.: 702,642

[22] PCT Filed: Feb. 22, 1995

[86] PCT No.: PCT/DE95/00296

§ 371 Date: Feb. 5, 1997

§ 102(e) Date: Feb. 5, 1997

[87] PCT Pub. No.: WO95/24725

PCT Pub. Date: Sep. 14, 1995

[30]  Foreign Application Priority Data

Mar. 9, 1994 [DE] Germany ............... 44 08 631.8

[51] Int. Cl.[6] .................................................. G08B 21/00
[52] U.S. Cl. .......................... 307/139; 321/415; 321/417; 321/418; 321/422; 364/550; 364/550.01; 340/635; 340/644; 327/384
[58] Field of Search .................... 307/134; 324/415, 324/416, 417, 418, 419, 420, 421, 422; 364/550, 550.01; 340/644, 635; 327/384

[56]  References Cited

U.S. PATENT DOCUMENTS

| | | | |
|---|---|---|---|
| 3,765,015 | 10/1973 | Gruner | 327/384 |
| 4,323,890 | 4/1982 | Lemke | 340/524 |
| 4,398,144 | 8/1983 | Heidemann | 340/644 |
| 4,864,286 | 9/1989 | Ohshita et al. | 340/644 |
| 4,945,256 | 7/1990 | Tada et al. | 307/139 |
| 5,585,678 | 12/1996 | Dijk et al. | 340/644 |
| 5,629,869 | 5/1997 | Johnson et al. | 364/551.01 |

FOREIGN PATENT DOCUMENTS

| | | |
|---|---|---|
| 41 31 828 C1 | 4/1993 | Germany. |
| WO 93/23760 | 11/1993 | WIPO. |

OTHER PUBLICATIONS

"Developments in Design and Performance of EVH Switching Equipment", IEEE Conference Publication No. 182, pp. 126–129 (1979).

Primary Examiner—William M. Shoop, Jr.
Assistant Examiner—Albert W. Paladini
Attorney, Agent, or Firm—Kenyon & Kenyon

[57] ABSTRACT

A device for monitoring the safety operation of power switches, in particular vacuum power switches in medium voltage switchboards. The device has a microprocessor unit that consists of a microprocessor, a microprocessor control and process-oriented storage means. The microprocessor is controlled by an angle pulse and a direction of a rotation recognition device. While the movement of the moving part of the power switch under the influence of states of operation is converted, the device detects the available data of the power switches. The device according to the present invention is especially well-suited in medium voltage switchboards for documenting and forecasting the real state of power switches.

6 Claims, 2 Drawing Sheets

DEVICE FOR MONITORING THE OPERATION SAFETY OF POWER SWITCHES

FIELD OF THE INVENTION

The present invention relates to a device for monitoring the operating safety of power switches, and in particular, for monitoring vacuum power switches in medium-voltage switchgear.

BACKGROUND INFORMATION

A device for monitoring the operating safety of power switches is described in PCT International Application No. WO 93/23760.

A variety of operating parameters of critical power switches are recorded by appropriate monitoring devices and stored in individual monitoring memory devices. This data is then called up by a superior calculating unit and compared with already-available data from non-critically operating power switches and evaluated. In the event of major deviations, maintenance procedures can be initiated if required, or complete shutoff processes can be triggered.

A testing program for detecting environmental influences on such power switches is described for example in the publication "Developments in Design and Performance of EHV Switching Equipment," IEEE Conference Publication Number 182, 1979, pages 126–129. According to this article, electrical switching capacity tests are performed using a synthetic test circuit (as well as a number of mechanical tests) to test the switching ability of the contacts, for example, in the course of a certain number of switching processes, etc., as well as their contact resistance and the close proximity of contacts such as the gas pressure conditions. In addition, the mechanical loads on moving parts of the power switching equipment are tested to determine the data relevant to operating safety on the power switches as a function of switching frequency.

In German Patent No. 41 31 828, a method is described for checking the mechanical functions of an electrical switch exposed to environmental influences. The method described therein employs a series of tests to detect and evaluate the fluctuations of spring-loaded storage devices, various loads caused by friction in bearings, and similar phenomena. The goal of this conventional method is to employ the comparative data thus obtained to draw conclusions about the state and application of a power switch that has just been tested. Thus, for example, the rotational speed of the operating shaft is detected by means of a displacement sensor (position encoder) of the type conventionally used in electrical engineering, and determined by calculating the corresponding switching energy values under the existing environmental influences. If sufficient comparative values for these load switches are available from measurements and calculations of power switches of the same type investigated previously, the limits of the range of application of the power switch being tested can be determined by a comparative examination.

SUMMARY OF THE INVENTION

The present invention provides a device for monitoring the operating safety of power switches, especially vacuum power switches in medium-voltage switchboards. The device includes data-processing microprocessor units having a microprocessor, a microprocessor control, and a processor-oriented memory device. The device also includes current detection devices for detecting and converting a rated current of the power switch and for detecting and converting a motor current that drives the movable part of the power switch. In addition, the device includes a current detection device with current converters for signal adaptation.

The present invention considerably expands on conventional methods by refining the individual method steps in such fashion that in addition to the purely mechanical conditions that are available in a normal state, as many of the relevant influential parameters as possible can be used to evaluate the operating safety of power switches.

The device according to the present invention includes a microprocessors unit which is connected to an angle pulse rotation direction detection device which converts a movement of a movable part of the power switch into data that can be processed by a microprocessor. The device includes a current-voltage converter and a parasitic voltage filter device. The microprocessor unit is connected with a sensor device which detects the ambient temperature in the power switch, the output signal being fed through a filter unit and an analog-digital converter unit to the microprocessor unit. The microprocessor unit is connected with a digital input device that recognizes the switching functions of the respective power switch, the incoming signals of said input device being capable of being fed through another filter device and a pulse-shaping device (ST) to the microprocessor unit. The microprocessor unit is connected to an interface conversion unit that receives the input control signals.

By using a microprocessor unit according to the present invention defined as a device for monitoring the operation of power switches, all the operating parameters can be entered directly as uncalculated data information. In addition, suitable linking mechanisms can produce data from which suitable statistical evaluations can be used to draw conclusions about the status of the power switch being tested. One of the components of the device according to the present invention includes the angle pulse and rotation direction recognition device, with which both the magnitude and pattern of the switching angle of the operating shaft can be transmitted within certain time intervals, as well as the rotational angular velocity itself, as a data value to the microprocessor. Concurrently, the microprocessor with the current detection device has two ways of detecting the current: firstly, the motor current that flows through the motor to tighten the spring drive is detected, and secondly, the coil current generated in the current converter is detected. The actual current detection device consists essentially of two parts: the current converter and the signal adapter with a filter unit for eliminating any parasitic voltages that may have penetrated. The output signal generated by the current converter is proportional to the rated current that is flowing, so that a rated current of 100 A in the converter can be represented by an alternating current of 100 mA. This alternating current is converted in known fashion into a voltage that can be processed by an A/D converter of the microprocessor, rectified and filtered.

In addition, the sensor device can be used to detect an ambient temperature within the power switch, and to feed the temperature through the filter device and an A/D converter to the microprocessor.

Using a digital input device, individual switching functions of the power switch equipment (especially the power switch itself) can be interrogated by the service department. For such purpose, a specific measuring voltage is applied to the linked power switch equipment and the incoming signals are transmitted through the additional filter device and pulse-shaping device located downstream to the microprocessor.

According to an embodiment of the present invention, the device for monitoring the operating safety of power switches also includes a storage device that is equipped with a storage area represented by a random access memory and an erasable programmable read-only memory. The storage device is connected with the microprocessor unit through a multiple data transmission unit.

The storage device is configured so that the lower address range is located in the external random access memory such that it can use a rapid data transfer to produce, for example, a photoelectric oscillogram.

In addition, the data exchange produced by initialization between the programmable read-only memory and the random access memory is controlled by the multiple data transmission unit.

According to another embodiment of the present invention, the device includes an erasable programmable read-only memory having a rapid access area that records the writing and erasing process using rapid writing processes of the microprocessor unit. The state of the read-only area is stored in a status register integrated therein and also capable of being called up during the write-erase processes.

Thus, the microprocessor can determine the processes and results of the initiated procedures by simple read accesses to the status register. In order to permit complete programmability by the operator, it is also possible to replace the read-only memory by a rapid access memory. However, the use of programmable logic modules in a core area of the microprocessor for the purpose of free configurability is increasingly subject to observation of operating safety. Accordingly, it is necessary to adjust the time behavior of the programmable storage devices to one another.

Yet another embodiment of the present invention provides that the microprocessor control is equipped with a voltage detector which generates a malfunction signal when the microprocessor unit drops below a minimum acceptable supply voltage. Thus, the malfunction signal can be transmitted to the microprocessor unit as a network failure signal.

This embodiment according to the present invention ensures that in the event of inadmissible voltage fluctuations, the device is switched off by the malfunction signal, and thus no incorrect data can be used for monitoring the operating safety.

Another embodiment of the present invention provides that the microprocessor unit is mounted in a multilayer arrangement on a printed circuit board which can be installed outside the power switching equipment. The microprocessor unit is supplied with a number of electromagnetically shieldable plug-in connector leads that correspond to the number of functional monitorings that can be detected in a sensory manner.

Using this arrangement, the device for monitoring the operating safety of the power switching equipment can be connected in simple fashion with the power switching equipment to be monitored and the data required for evaluation can be obtained without difficulty.

DETAILED DESCRIPTION

Figure 1:
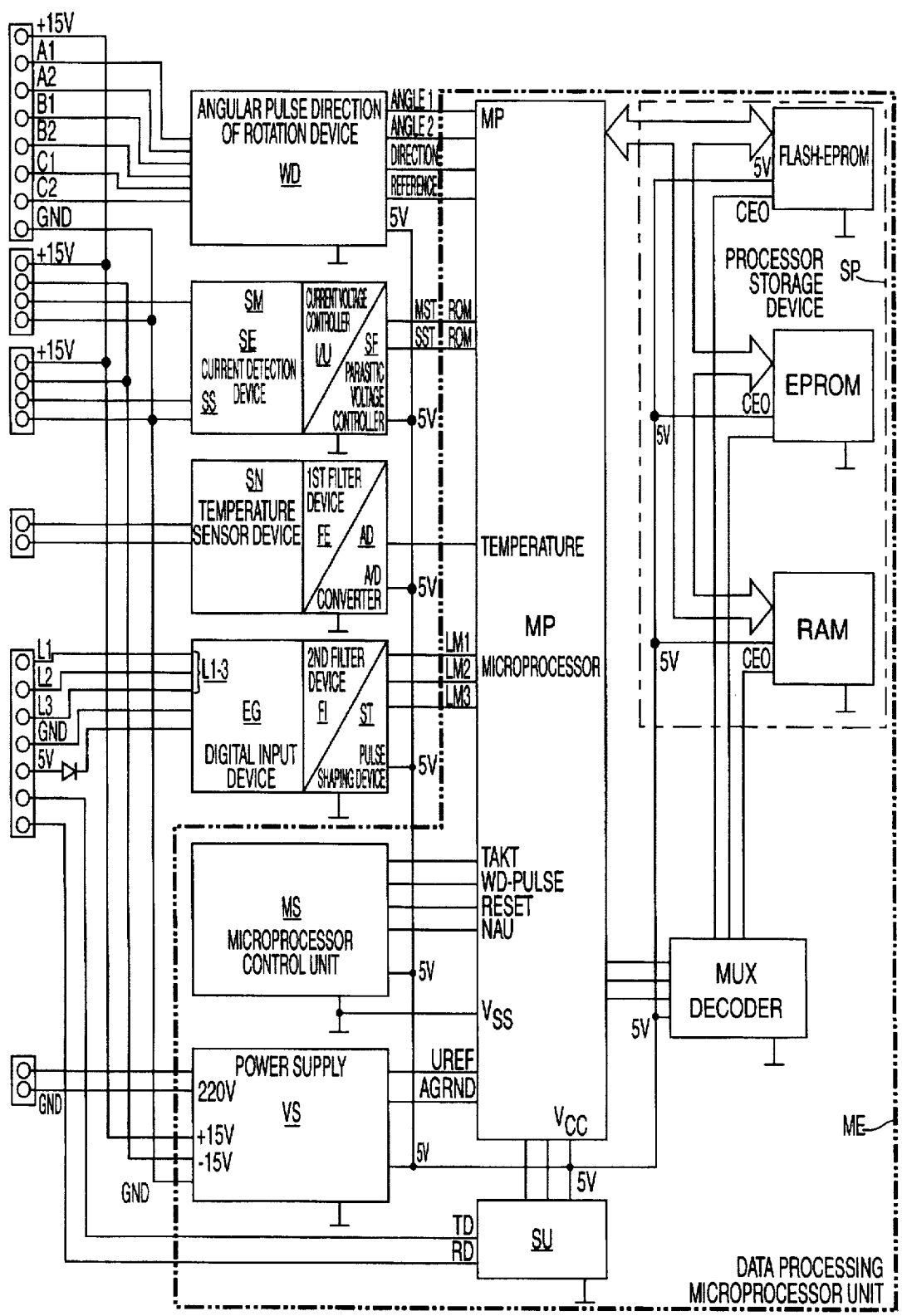
FIG. 1 shows a device according to the present invention.
Figure 2:
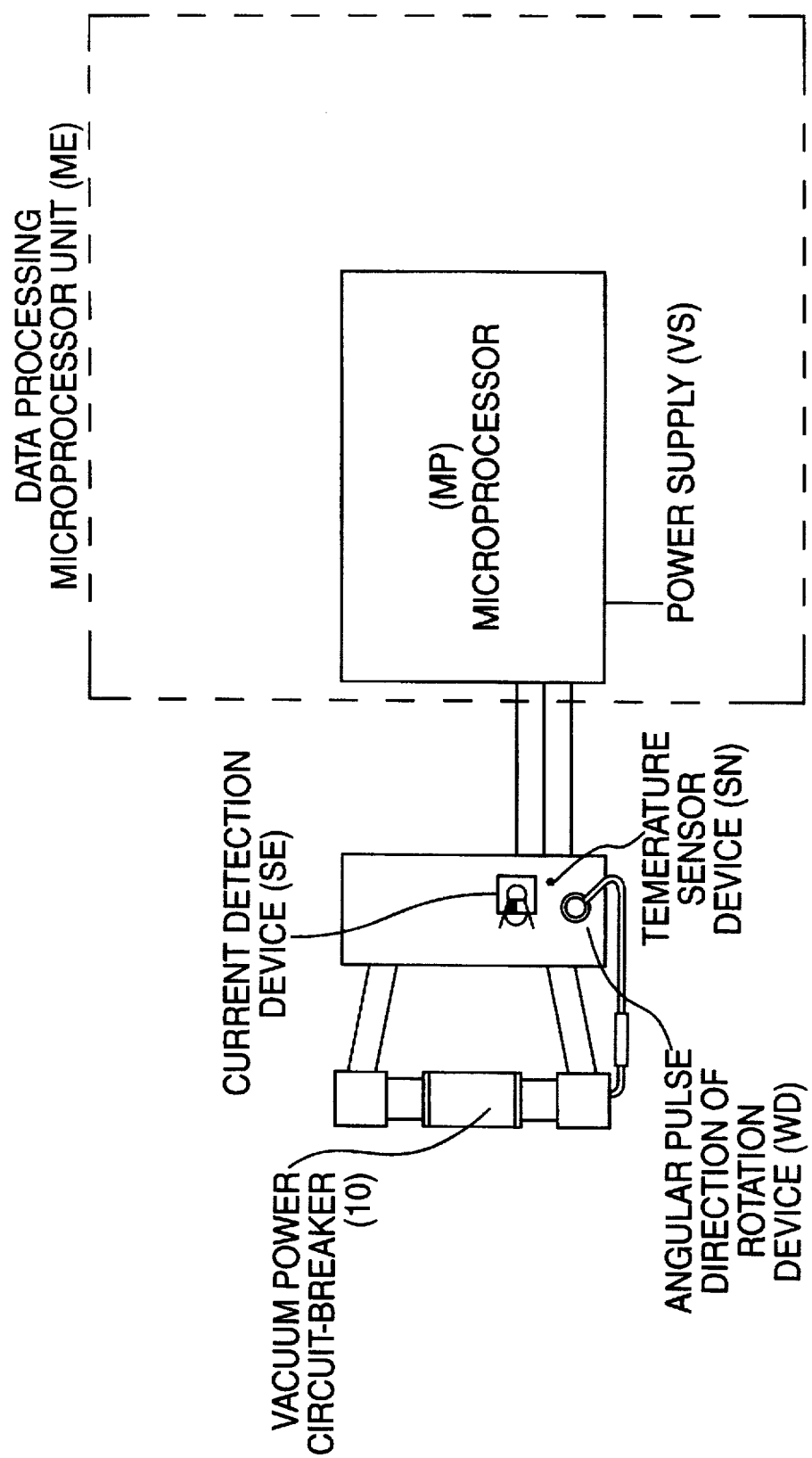
FIG. 2 shows an exemplary arrangement of the device illustrated in FIG. 1 for monitoring vacuum power circuit-breakers.

A device for monitoring the operating safety of power switching equipment, as shown in FIG. 1, contains a data processing microprocessor unit ME which includes a microprocessor MP with a corresponding microprocessor control MS and a processor-oriented storage device SP. The movement of a moving part of the power switching equipment is transmitted to microprocessor MP by the angle pulse and rotation direction detection device WD, in a form that can be processed by a microprocessor. In addition, the data-processing microprocessor unit ME is connected with a current detection device SE which detects and converts the rated current of the power switching device into a coil current SS and recognizes and converts the motor current SM that drives the movable part of the power switching equipment (e.g., vacuum power circuit-breaker 10 shown in FIG. 2). The vacuum power circuit-breaker 10, e.g., encloses current detection device SE, angular pulse direction of rotation device WD and temperature sensor device SN. Current detection device SE also includes current/voltage converter I/U which, in cooperation with parasitic voltage filter unit SF, feeds the angle pulse and rotation direction data directly to microprocessor MP. In addition, microprocessor unit ME receives output signals from sensor device SN that detects the ambient temperature in the power switch, said output signals being transmitted in the same fashion through a filter unit FE and an analog/digital converter unit AD to microprocessor MP. Using a digital input device EG by which the switching functions of the respective load power switching device are detected, their incoming signals L1 to L3 are likewise fed through a filter device FI in order then to be transmitted to microprocessor MP as well, under the controlling influence of pulse-shaping device ST. With interface conversion unit SU, corresponding input signals for controlling microprocessor unit ME can be entered directly in microprocessor MP.

Storage device SP of microprocessor unit ME consists of both random access memory RAM and erasable programmable read-only memory EPROM, with their deliberate data control being handled by a multiple data transmission unit MUX. As can be seen from the embodiment, erasable programmable read-only memory EPROM has a rapid access area Flash-EPROM for the writing and erasing processes caused by rapid writing processes in producing oscillograms.

Microprocessor control MS also contains a voltage detector (not shown) which, when a minimally acceptable supply voltage is undershot by supply voltage device VS, generates network failure signal NAU that interrupts data direction during operating safety monitoring of the power switch.

The device according to the present invention is mounted using multilayer technology on a printed-circuit board that can be located outside the power switch under test, if necessary. The information obtained by appropriate sensors inside the power switching equipment is fed directly to the printed circuit board through electromagnetically shieldable plug-in connector leads. The parameters that can be detected directly and recorded as oscillograms, including motor, trigger, and short circuit currents, operating voltages, and rotational angle changes in values and speeds during corresponding temperature changes for example, all serve for individual characterization of the power switch tested, so that reliable statements can be made regarding their motor and switching functions.

The individual power switch values, depending on the requirement, can then be subjected to temperature, voltage, and/or time-compensated classification, so that with a correspondingly large number of comparative values for a certain system type, for example, the scatter ranges of certain individual features can be determined. Thus, conclusions regarding the availability of such power switches in the individual state can be made and can be used immediately for both acceptance and startup of the power switch.

In this connection, it is also possible to provide such devices according to the present invention as fixed elements of a completely installed power switching installation, and to use periodic recording of changes in state over a certain time interval to generate a form of lifetime document that can be used for example by the service department for maintenance purposes. By suitably evaluating and converting these data, the required maintenance tasks can also be transmitted directly to the responsible control rooms.

With these devices, forecasts can also be made regarding the future functional behavior of the power switch, such that its operating safety is considerably increased. On the other hand, by using this device according to the present invention in cases where systems are operating reliably, maintenance intervals can be extended considerably and damage prevented.

What is claimed is:

1. A device for monitoring at least one power switch having a movable part, comprising:

at least one data-processing microprocessor unit including a microprocessor, a microprocessor control device and a memory device;

at least one current detection device for detecting a first current of the power switch and for detecting and controlling a second current driving the movable part of the at least one power switch;

a current detection device including a current converter, a current-voltage converter and a parasitic voltage filter coupled downstream from the current converter, an angle pulse and rotation direction detection device connected to the at least one data-processing microprocessor unit, the angle pulse and rotation direction detection device converting a movement of the movable part of the power switch into data for processing by the microprocessor device;

a first filter unit;

an analog-to-digital converter;

a sensor device for detecting an ambient temperature in the power switch, the sensor device having an output signal which is provided via the first filter unit and the analog-to-digital converter to the microprocessor unit;

a digital input device for detecting if the power switch changes from a first state to a second state using one or more input signals, the digital input device being connected to the microprocessor unit;

a second filter device;

a pulse-shaping device, wherein the one or more input signals applied to the digital input device are provided to the microprocessor unit via at least one of the second filter device and the pulse-shaping device the pulse-shaping device being capable of modifying the one or more input signals as a function of a predetermined pulse-shaping characteristic; and an interface conversion unit connected to the microprocessor unit and receiving input control signals.

2. The device according to claim 1, wherein the power switches include vacuum power switches in medium-voltage switchboards.

3. The device according to claim 1, wherein:

the memory device includes a random access memory and an erasable programmable read-only memory; and the memory device is coupled to the microprocessor unit via a multiple data transmission unit.

4. The device according to claim 3, wherein the erasable programmable read-only memory includes a rapid access area for receiving a writing/deleting process through rapid writing processes of the microprocessor unit, the rapid access area including a status register and an area state, the area state being recordable in the status register and being retrievable during write-erase processes.

5. The device according to claim 1, wherein the microprocessor control device includes a voltage detector for generating a malfunction signal if a supply voltage provided to the microprocessor unit falls below a predetermined voltage, the malfunction signal being transmittable to the microprocessor unit as a network failure signal.

6. The device according to claim 1, wherein the microprocessor unit is situated in a multilayer arrangement on a printed circuit board, and wherein the microprocessor unit receives a plurality of electromagnectically shieldable plug-in connector leads corresponding to a plurality of functional monitoring readings detectable in a sensory manner.

* * * * *